United States Patent
Wang et al.

(10) Patent No.: US 9,769,667 B2
(45) Date of Patent: Sep. 19, 2017

(54) METHODS FOR CONTROLLING SMART DEVICE

(71) Applicant: Xiaomi Inc., Beijing (CN)

(72) Inventors: Yuanbo Wang, Beijing (CN); Deguo Meng, Beijing (CN); Enxing Hou, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/137,002

(22) Filed: Apr. 25, 2016

(65) Prior Publication Data

US 2017/0094522 A1    Mar. 30, 2017

(30) Foreign Application Priority Data

Sep. 29, 2015 (CN) .......................... 2015 1 0634008

(51) Int. Cl.

| | |
|---|---|
| *H04M 1/66* | (2006.01) |
| *H04M 1/68* | (2006.01) |
| *H04M 3/16* | (2006.01) |
| *H04W 12/08* | (2009.01) |
| *H04W 12/06* | (2009.01) |
| *H04W 4/06* | (2009.01) |
| *H04W 12/04* | (2009.01) |
| *H04M 1/725* | (2006.01) |

(52) U.S. Cl.
CPC ....... *H04W 12/08* (2013.01); *H04M 1/72533* (2013.01); *H04W 4/06* (2013.01); *H04W 12/04* (2013.01); *H04W 12/06* (2013.01)

(58) Field of Classification Search
CPC ....... H04W 12/08; H04W 12/04; H04W 4/06; H04W 12/06; H04M 1/72533
See application file for complete search history.

(56) References Cited

U.S. PATENT DOCUMENTS

| 8,059,621 | B2 * | 11/2011 | de Clerq | ................ G05B 15/02 370/218 |
|---|---|---|---|---|
| 8,931,068 | B2 * | 1/2015 | Haynes | ................... G06F 21/32 380/44 |
| 8,943,566 | B2 * | 1/2015 | DeLuca | .................. H04W 4/04 726/7 |

(Continued)

FOREIGN PATENT DOCUMENTS

| CN | 101833286 A | 9/2010 |
|---|---|---|
| CN | 103560891 A | 2/2014 |

(Continued)

OTHER PUBLICATIONS

International Search Report of PCT/CN2015/099404.

(Continued)

*Primary Examiner* — Ajit Patel

(74) *Attorney, Agent, or Firm* — Jun He Law Offices P.C.; James J. Zhu

(57) ABSTRACT

A control method implemented by a smart device is provided. The method includes: receiving control data sent by a terminal device. The control data contains a control instruction and signature data. The signature data was sent by a server to the terminal device. The method further includes verifying the signature data and if the verification is passed, causing the smart device to perform an operation corresponding to the control instruction.

6 Claims, 8 Drawing Sheets

(56) References Cited

U.S. PATENT DOCUMENTS

| | | | | |
|---|---|---|---|---|
| 8,972,729 B2* | 3/2015 | King | ............ | H04W 12/04 |
| | | | | 713/150 |
| 9,009,805 B1* | 4/2015 | Kirkby | ............ | G06K 9/00711 |
| | | | | 709/203 |
| 9,037,851 B2* | 5/2015 | Choi | ............ | G06F 21/32 |
| | | | | 713/159 |
| 9,319,404 B2* | 4/2016 | Svigals | ............ | H04L 63/0853 |
| 9,438,573 B2* | 9/2016 | Cregg | ............ | H04L 63/062 |
| 9,538,379 B2* | 1/2017 | Yu | ............ | H04W 12/06 |
| 9,549,313 B2* | 1/2017 | Park | ............ | H04W 12/04 |
| 2007/0061020 A1 | 3/2007 | Bovee | | |
| 2012/0166642 A1 | 6/2012 | Saint Clair et al. | | |
| 2014/0089671 A1 | 3/2014 | Logue et al. | | |
| 2015/0095933 A1 | 4/2015 | Blackburn et al. | | |
| 2016/0105420 A1* | 4/2016 | Engan | ............ | H04L 9/3228 |
| | | | | 455/411 |
| 2016/0234213 A1* | 8/2016 | Kim | ............ | H04L 63/0876 |

FOREIGN PATENT DOCUMENTS

| | | |
|---|---|---|
| CN | 104202170 A | 12/2014 |
| CN | 104202306 A | 12/2014 |
| CN | 104580191 A | 4/2015 |
| CN | 104936304 A | 9/2015 |
| EP | 1193593 A2 | 4/2002 |
| WO | 2015120161 A1 | 8/2015 |

OTHER PUBLICATIONS

C. Neuman et al, "The Kerberos Network Authentication Service (V5)", Jul. 31, 2005, Retrieved from the Internet: URL: https://www.ietf.org/rfc/rfc4120.txt.

\* cited by examiner

METHODS FOR CONTROLLING SMART DEVICE

CROSS-REFERENCE TO RELATED APPLICATIONS

The present application is based upon and claims priority to Chinese Patent Application No. 201510634008.8 filed Sep. 29, 2015, the entire contents of which are incorporated herein by reference.

TECHNICAL FIELD

The present disclosure generally relates to the field of computer technology, and more particularly, to methods for controlling a smart device.

BACKGROUND

With development of smart home technology, it is becoming a trend to control a smart device with a terminal device in future development. The smart device is generally provided with a smart module, which is built in with communication protocols for communication with the outside.

In the related art, a method for controlling a device is provided, including: a terminal device establishes connection with a server; a smart device having a smart module establishes connection with the server; the terminal device sends a control instruction to the server; the server forwards the control instruction to the smart module in the smart device; and the smart device performs operations corresponding to the control instruction.

SUMMARY

According to a first aspect of embodiments of the present disclosure, there is provided a control method implemented by a smart device configured with a smart module. The method includes: receiving control data sent by a terminal device. The control data contains a control instruction and signature data. The signature data was sent by a server to the terminal device. The method further includes verifying the signature data and if the verification is passed, causing the smart device to perform an operation corresponding to the control instruction.

According to a second aspect of embodiments of the present disclosure, there is provided a method implemented by a terminal device for controlling a smart device. The method includes: receiving signature data sent by a server; generating control data containing a control instruction and the signature data; and sending the control data to a smart module provided in a smart device, for the smart module to cause the smart device to perform an operation corresponding to the control instruction when the signature data passes verification.

According to a third aspect of embodiments of the present disclosure, there is provided a smart device configured with a smart module. The smart device includes: a processor; and a memory for storing instructions executable by the processor. The processor is configured to perform: receiving signature data sent by a server; generating control data containing a control instruction and the signature data; and sending the control data to a smart module provided in a smart device, for the smart module to cause the smart device to perform an operation corresponding to the control instruction when the signature data passes verification.

According to a fifth aspect of the embodiment of the present disclosure, there is provided a non-transitory computer-readable storage medium storing instructions, executable by a processor of a smart device configured with a smart module, causes the smart device to perform a method for controlling a device. The method includes: receiving control data sent by a terminal device. The control data contains a control instruction and signature data. The signature data was sent by a server to the terminal device. The method further includes verifying the signature data and if the verification is passed, causing the smart device to perform an operation corresponding to the control instruction.

According to a sixth aspect of the embodiment of the present disclosure, there is provided a non-transitory computer-readable storage medium storing instructions, executable by a processor of a terminal device, causes the terminal device to perform a method for controlling a smart device. The method includes: receiving signature data sent by a server; generating control data containing a control instruction and the signature data; and sending the control data to a smart module provided in a smart device, for the smart module to cause the smart device to perform an operation corresponding to the control instruction when the signature data passes verification.

The technical solution according to embodiments of the present disclosure may have the following beneficial effects.

In the method for controlling a device provided by the present embodiment, control data sent by the terminal device is received. The control data contains a control instruction and signature data, the signature data is sent by the server to the terminal device. The signature data shall be verified before the smart device performs the operations corresponding to the control data. If the signature data is verified, the smart device performs an operation corresponding to the control instruction. Thereby, the smart module can verify the identity of the terminal device according to the signature data, and after the signature data is verified, the smart device performs the control instruction sent by the terminal device. It eliminates the need for a server to forward the control instruction sent by the terminal device. Therefore, it can solve the problem that real time performance of device control is poor when the control instruction of the smart device has to be forwarded by the server, thereby improving the real time performance of device control.

In addition, by storing the signature data, the terminal device can, in a next time, directly send control data containing a control instruction and signature data to the smart module. After the signature data is verified, the smart device can perform the control instruction sent by the terminal device. It is not necessary to acquire signature data each time from the server, and thus can save time for acquiring signature data from the server. Therefore, it can improve the real time performance of device control.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
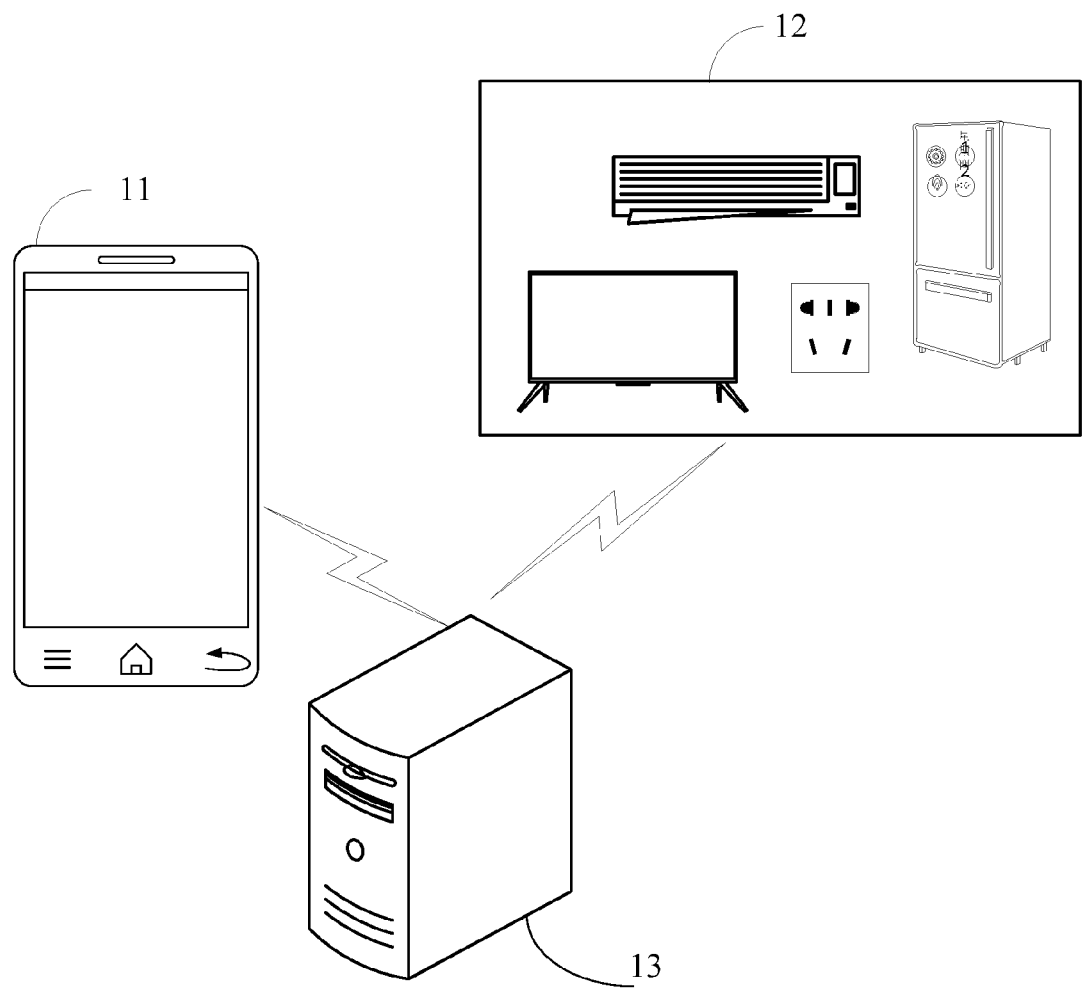
FIG. 1 is a diagram of an implementation environment of a system for controlling a device involved in embodiments.

FIG. 1 is a diagram of an implementation environment of a system for controlling a device involved in embodiments of the present disclosure. As shown in FIG. 1, the system for controlling a device includes a terminal device 11, a smart device 12 and a server 13. The terminal device 11 can be a mobile phone, a tablet computer, a PC or the like. The smart device 12 can be a smart television, a smart refrigerator, a smart air conditioner, a smart socket, or the like.

The smart device 12 is provided with a smart module. The smart module is configured to be connected to the server 13 via a wired or wireless network. The smart module can be a Wireless Fidelity (WiFi) module, or can be other module. This is not limited by the present disclosure.

The terminal device 11 can be connected to the server via a wired or wireless network.

Figure 2:
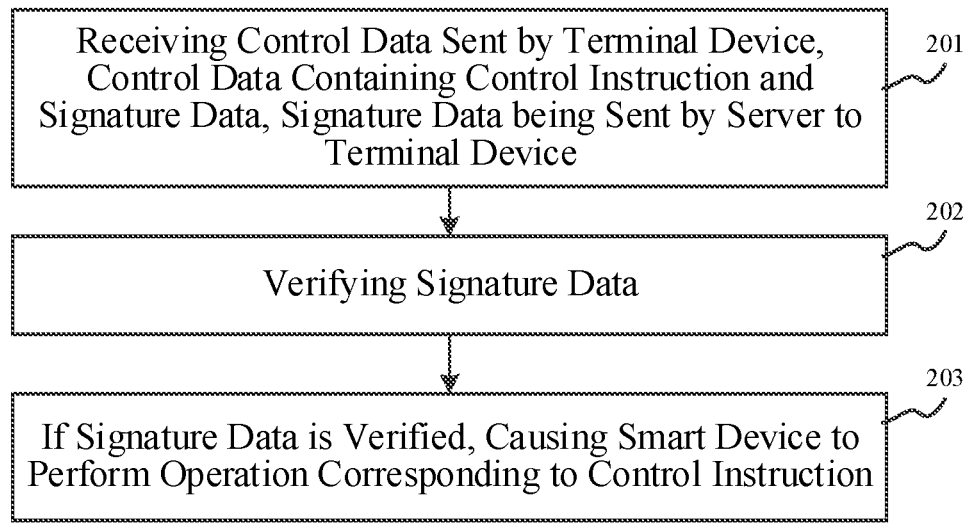
FIG. 2 is a flow chart illustrating a method for controlling a device according to an exemplary embodiment.

FIG. 2 is a flow chart illustrating a method for controlling a device according to an exemplary embodiment. The method for controlling a device is applied in the smart module provided in the smart device. As shown in FIG. 2, the method for controlling a device includes the following steps.

In step 201, control data sent by a terminal device is received. The control data contains a control instruction and signature data, and the signature data was sent by a server to the terminal device.

In step 202, the signature data is verified.

In step 203, if the signature data is verified, the smart device performs an operation corresponding to the control instruction.

In summary, in the method for controlling a device provided by the present disclosure, the control data received from the terminal device contains signature data, which shall be verified before the smart device performs the operations corresponding to the control data. Thereby, the smart module can verify identity of the terminal device based on the signature data. If the signature data is verified, the smart device can perform the control instruction sent by the terminal device, while the control instruction sent by the terminal device is not required to be forwarded by a server. Thus, it can solve the problem that real time performance of device control is poor when the control instruction of the smart device is forwarded by a server, thereby improving the real time performance of device control.

Figure 3:
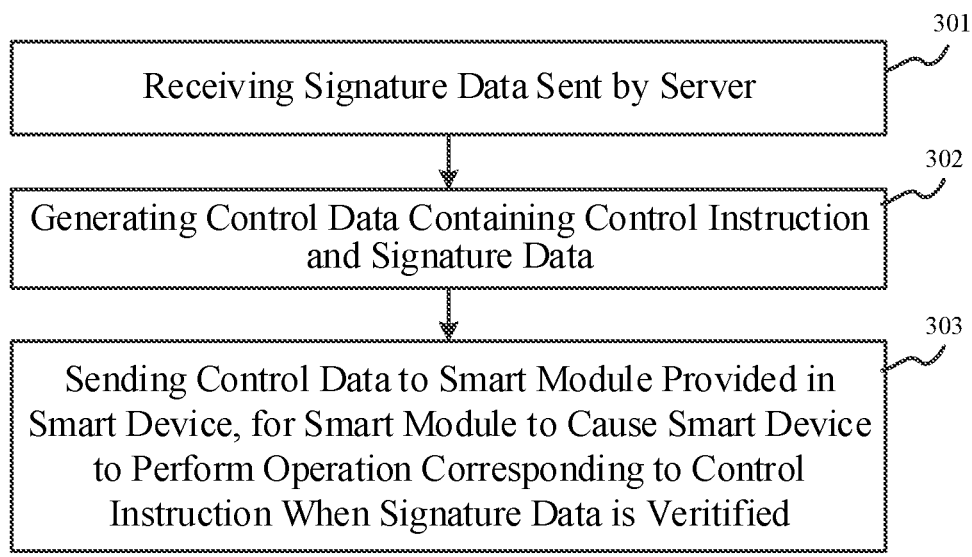
FIG. 3 is a flow chart illustrating a method for controlling a device according to an exemplary embodiment.

FIG. 3 is a flow chart illustrating a method for controlling a device according to an exemplary embodiment. The method for controlling a device is applied in the terminal device. As shown in FIG. 3, the method for controlling a device includes the following steps.

In step 301, signature data sent by a server is received.

In step 302, control data containing a control instruction and the signature data is generated.

In step 303, the control data is sent to a smart module of a smart device. The smart device performs an operation corresponding to the control instruction when the signature data is verified.

In summary, in the method for controlling a device provided by the present disclosure, the signature data sent by the server is received. Control data is generated, containing a control instruction and the signature data. The control data is sent to the smart module of the smart device, such that the smart module can verify the identity of the terminal device based on the signature data. After the signature data is verified, the smart device performs the control instruction sent by the terminal device. Therefore, the control instruction sent by the terminal device is not required to be forwarded by a server. Thus, it can solve the problem that real time performance of device control is poor when the control instruction of the smart device is forwarded by a server, thereby improving real time performance of device control.

Figure 4A:
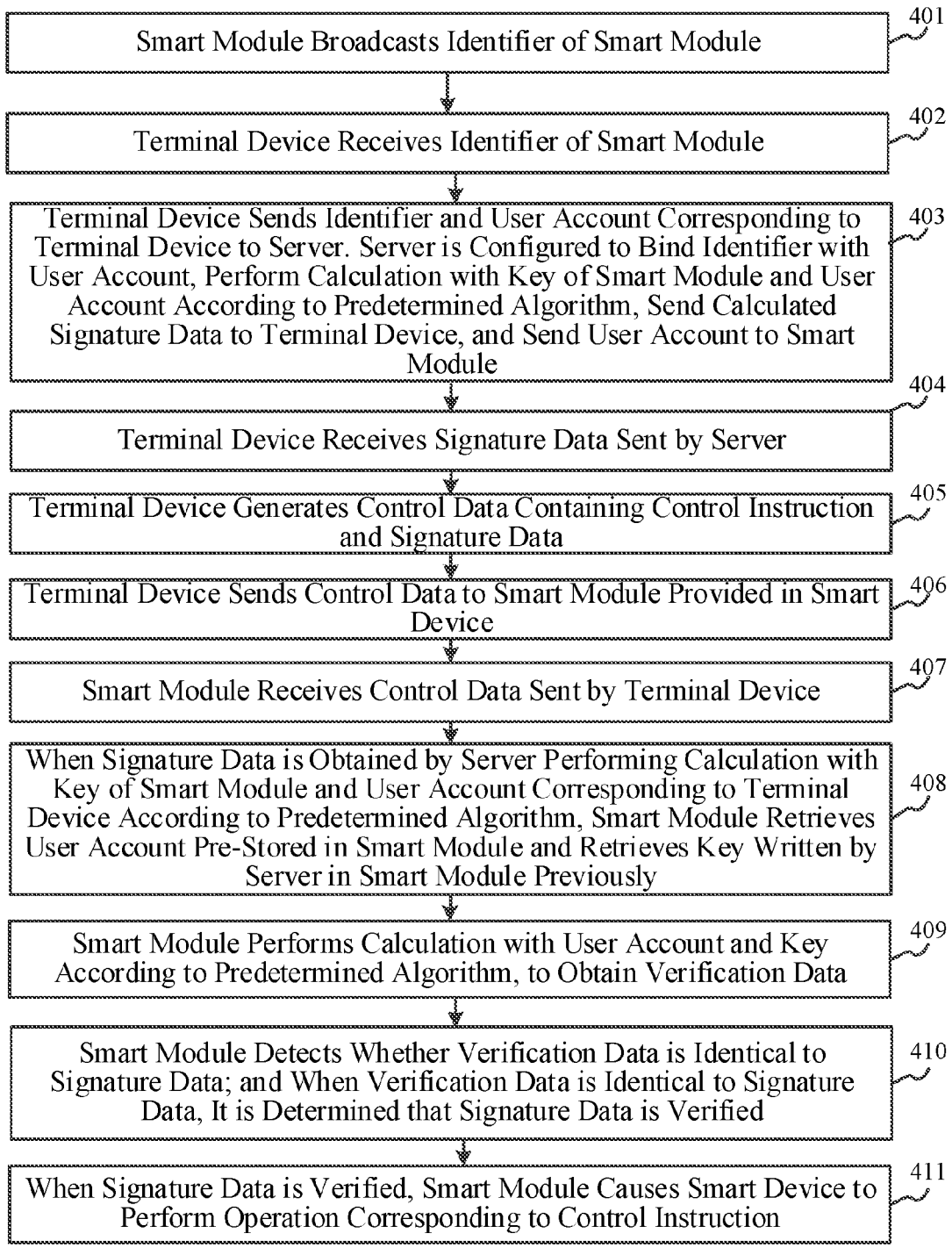
FIG. 4A is a flow chart illustrating a system for controlling a device according to the embodiments.

FIG. 4A is a flow chart illustrating a system for controlling a device according to the embodiments. As shown in FIG. 4A, the method of the system for controlling a device includes the following steps.

In step 401, the smart module broadcasts an identifier of the smart module.

After the terminal device is connected into the network via a router, the terminal device can acquire a Service Set Identifier (SSID) and an access password. The terminal device broadcasts the SSID and the access password. After the smart module acquires the SSID and the access password, the smart module can be connected to the network via the router. After the smart module is connected to the network, the smart module broadcasts the identifier of the smart module. The identifier can be a Media Access Control (MAC) address of the smart module, or can be an ID of the smart module. This is not limited by the embodiment.

In step 402, the terminal device receives the identifier of the smart module.

In step 403, the terminal device sends the identifier and a user account corresponding to the terminal device to the server. The server is configured to bind the identifier with the user account, to perform calculation of a key of the smart module and the user account using a predetermined algorithm, to send the calculated signature data to the terminal device, and to send the user account to the smart module.

The terminal device sends the received identifier of the smart module along with the user account of the terminal device to the server. The server detects whether there is a user account bound with the identifier. If there is another user account bound with the identifier, the server returns a notification message to the terminal device informing that the binding with the user account fails. If there is no user account bound with the identifier, the terminal device binds the identifier with the user account. The user account corresponding to the terminal device can be a user account for logging in the terminal device.

After the binding is completed, the server can also retrieve a key corresponding to the identifier using predetermined corresponding relationships, and perform calculation of the key and the user account using the predetermined algorithm, to obtain signature data. The predetermined corresponding relationships are used to store corresponding relationships between identifiers of smart modules and their keys. A key of a smart module is assigned by the server and is written into the smart module, for encrypting data of communication between the smart module and the server to ensure the security of the data. The technology of obtaining signature data using a predetermined algorithm is very mature, and will not be described herein.

After the server receives the signature data, the server sends the signature data to the terminal device. The terminal device stores the signature data. The server sends the user account to the smart module, and the smart module receives the user account.

In the present step, a first signature is obtained when the user account is bound with the smart module, and the calculated signature data is sent to the terminal device to directly control the smart device with the signature data later. Thus, the terminal device is not required to control the smart device via the server each time. Thereby, it can control the smart device more rapidly.

In step 404, the terminal device receives the signature data sent by the server.

In step 405, the terminal device generates control data containing a control instruction and the signature data.

When the terminal device is required to control the smart device, the terminal device can generate a control instruction and control data containing the control instruction and the signature data corresponding to the smart device. The control instruction is an instruction for controlling the smart device, for example, powering on/off the smart device, tuning up/down volume, controlling the smart device to rotate, and so on. This is not limited by the present embodiment.

In step 406, the terminal device sends the control data to the smart module of the smart device.

In step 407, the smart module receives the control data sent by the terminal device.

In step 408, when the signature data is obtained by the server performing calculation of the key of the smart module and the user account corresponding to the terminal device using a predetermined algorithm, the smart module retrieves a user account pre-stored in the smart module and the key written by the server in the smart module previously.

In the present step, the user account is the user account sent by the server to the smart module in step 403.

The smart module can also retrieve the key previously assigned by the server and the key is written in the smart module.

In step 409, the smart module performs calculation of the user account and the key using a predetermined algorithm, to obtain verification data.

The predetermined algorithm for obtaining the verification data is the same as the predetermined algorithm for obtaining the signature data.

In step 410, the smart module detects whether the verification data is identical to the signature data; and when the verification data is identical to the signature data, it is determined that the signature data is verified.

Since the predetermined algorithm for obtaining the verification data is the same as the predetermined algorithm for obtaining the signature data, if the verification data is identical to the signature data, it means that the key stored in the smart module is identical to the key stored in the server, and the user account stored in the smart module is identical to the user account stored in the server. Therefore, the signature data is verified. The verification of the signature data can ensure the security of the data transmitted between the terminal device and the smart module.

In step 411, when the signature data is verified, the smart module instructs the smart device to perform an operation corresponding to the control instruction.

When the signature data is verified by the smart module, it can be determined that the terminal device has the permission to control the smart device. Then, the smart device can perform an operation corresponding to the control instruction received by the smart module.

Figure 4B:
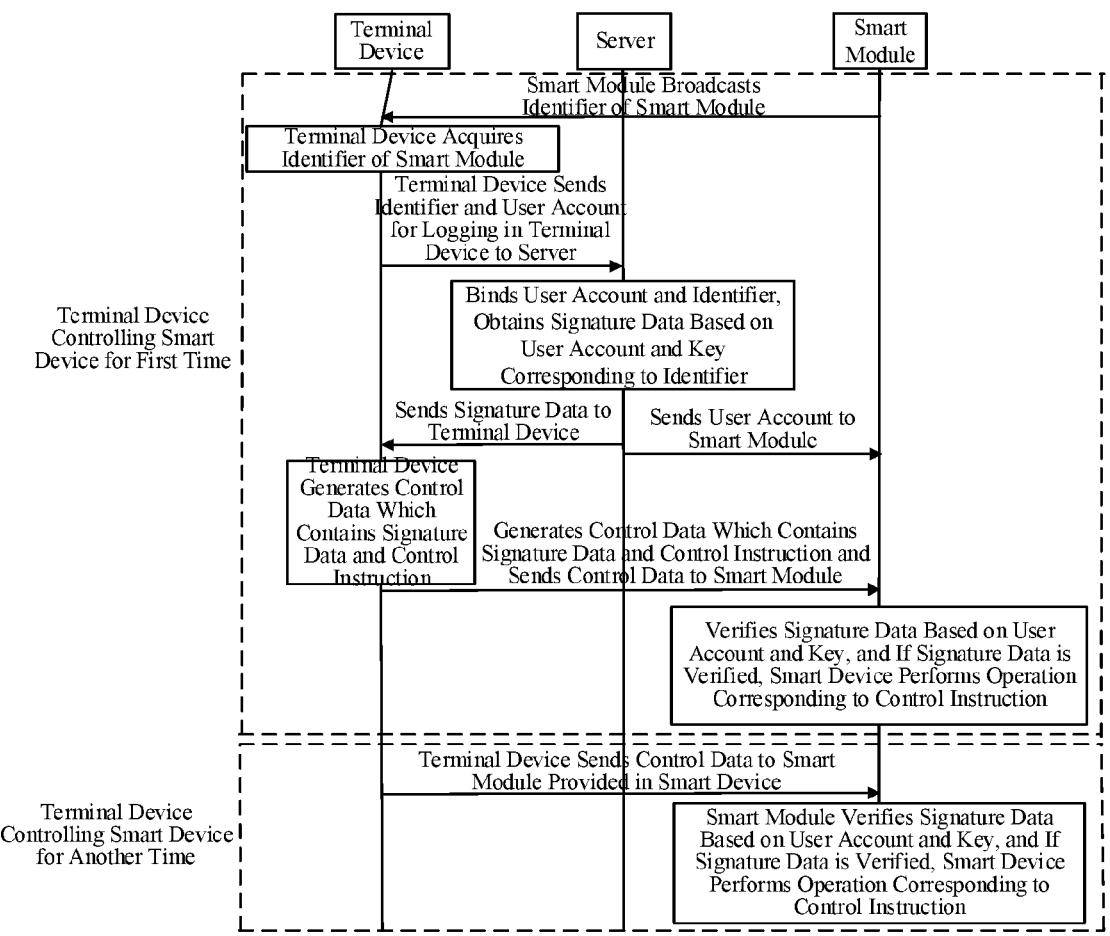
FIG. 4B is a flow chart illustrating a terminal device controlling a smart device according to the embodiments.

FIG. 4B is a flow chart illustrating a terminal device controlling a smart device according to the embodiments. As shown in FIG. 4B, firstly, the terminal device acquires an identifier of the smart module, and sends a user account for logging in the terminal device and the identifier to the server. The server binds the user account with the identifier, obtains signature data based on the user account and a key corresponding to the identifier, sends the signature data to the terminal device, and sends the user account to the smart module. The terminal device generates control data, which contains the signature data and a control instruction, and sends the control data to the smart module. The smart module verifies the signature data based on the user account and the key, and if the signature data is verified, the smart device performs an operation corresponding to the control instruction.

Subsequently, if the terminal device is required to control the smart device again, the terminal device can directly generate control data, which contains the signature data and a control instruction, and send the control data to the smart module. The smart module verifies the signature data based on the user account and the key, and if the signature data is verified, the smart device performs an operation corresponding to the control instruction. At this time, the terminal device is not required to acquire signature data from the server repeatedly. Therefore, it can save the time of acquiring signature data from the server, thereby improving the efficiency of device control.

Figure 4C:
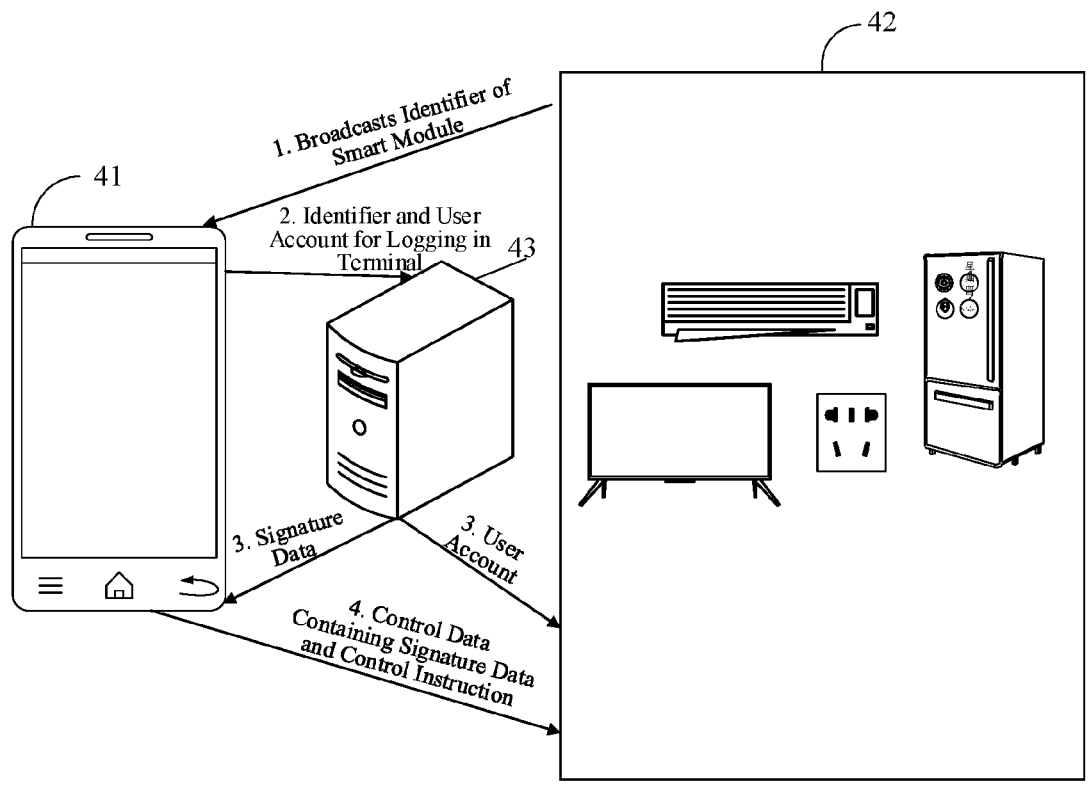
FIG. 4C is a schematic diagram illustrating a terminal device controlling a smart device according to the embodiments.

FIG. 4C is a schematic diagram illustrating a terminal device controlling a smart device according to the embodiments. The control process is as follows.

1. A smart module of a smart device 42 broadcasts an identifier of the smart module.

2. A terminal device 41 sends the identifier and a user account for logging in the terminal device 41, to a server 43.

3. The server 43 sends the obtained signature data to the terminal device 41, and sends the user account to the smart module.

4. The terminal device 41 generates control data containing the signature data and a control instruction, and sends the control data to the smart module.

If the terminal device needs to control the smart device subsequently, the terminal device can perform the step 4 directly.

Accordingly, in the method for controlling a device provided by the present embodiment, the control data sent by the terminal device is received, and the control data contains a control instruction and signature data. The signature data is sent to the terminal device by the server, and the signature data is verified. When the signature data is verified, the smart device performs operation corresponding to the control instruction. Thus, the smart module can verify the identity of the terminal device based on the signature data. After the signature data is verified, the smart device performs an operation corresponding to the control instruction sent by the terminal device without requiring the server to forward the control instruction sent by the terminal device. It can solve the problem that real time performance of device control is poor due to forwarding instructions via the server in order to control the smart device, thereby improving the real time performance of device control.

In addition, the signature is stored such that the terminal device can directly send control data containing a control instruction and the signature data to the smart module next time. After the smart module verifies the signature data, the smart device is instructed to perform the control instruction sent by the terminal device. It won't be necessary to acquire signature data from the server every time, therefore, it can save time of acquiring signature data from the server and it can improve the efficiency in device control.

Figure 5:
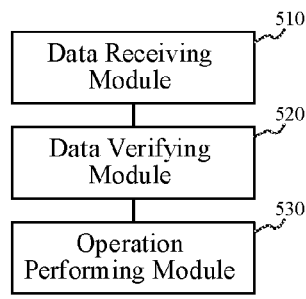
FIG. 5 is a block diagram of an apparatus for controlling a device according to an exemplary embodiment.

FIG. 5 is a block diagram of an apparatus for controlling a device according to an exemplary embodiment. The apparatus for controlling a device is applied in a smart module of a smart device. As shown in FIG. 5, the apparatus for controlling a device includes: a data receiving module 510, a data verifying module 520 and an operation performing module 530.

The data receiving module 510 is configured to receive control data sent by a terminal device, wherein the control data contains a control instruction and signature data sent by a server to the terminal device.

The data verifying module 520 is configured to verify the signature data received by the data receiving module 510.

The operation performing module 530 is configured to instruct the smart device to perform an operation corresponding to the control instruction, if the verification performed by the data verifying module 520 is passed.

In summary, in the apparatus for controlling a device provided by the present disclosure, control data received from the terminal device contains signature data which will be verified. If the signature data is verified, the smart device performs operation corresponding to the control data. Thereby, the smart module can verify identity of the terminal device based on the signature data. If the signature data is verified, the smart device can perform the control instruction sent by the terminal device. Therefore, the control instruction sent by the terminal device is not required to be forwarded via a server. Thus, it can solve the problem that real time performance of device control is poor when the control instruction of the smart device is forwarded via a server, thereby improving real time performance of device control.

Figure 6:
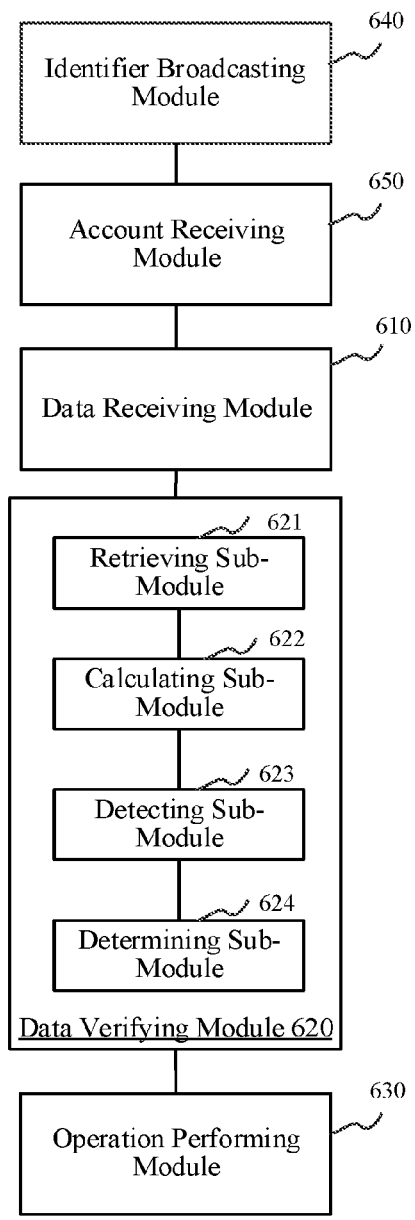
FIG. 6 is a block diagram of an apparatus for controlling a device according to an exemplary embodiment.

FIG. 6 is a block diagram of an apparatus for controlling a device according to an exemplary embodiment. The apparatus for controlling a device is applied in a smart module of a smart device. As shown in FIG. 6, the apparatus for controlling a device includes: a data receiving module 610, a data verifying module 620 and an operation performing module 630.

The data receiving module 610 is configured to receive control data sent by a terminal device, wherein the control data contains a control instruction and signature data sent by a server to the terminal device; the signature data is obtained by the server performing calculation of a key of the smart module and a user account corresponding to the terminal device using a predetermined algorithm.

The data verifying module 620 is configured to verify the signature data received by the data receiving module 610.

The operation performing module 630 is configured to instruct the smart device to perform an operation corresponding to the control instruction, if the verification performed by the data verifying module 620 is passed.

Optionally, the data verifying module 620 includes: a retrieving sub-module 621, a calculating sub-module 622, a detecting sub-module 623 and a determining sub-module 624.

The retrieving sub-module 621 is configured to retrieve a user account pre-stored in the smart module, and the key previously written by the server in the smart module.

The calculating sub-module 622 is configured to perform calculation of the user account and the key retrieved by the retrieving sub-module 621 using the predetermined algorithm, to obtain verification data.

The detecting sub-module 623 is configured to detect whether the verification data obtained by the calculating sub-module 622 is identical to the signature data.

The determining sub-module 624 is configured to determine that the signature data is verified, when it is detected by the detecting sub-module 623 that the verification data is identical to the signature data.

Optionally, the apparatus further includes: an identifier broadcasting module 640 and an account receiving module 650.

The identifier broadcasting module 640 is configured to broadcast an identifier of the smart module. The terminal device receives the identifier and send the identifier along with the user account to the server, so that the server can bind the identifier with the user account and generate the signature data. The server send the signature data to the terminal device, and send the user account to the smart module.

The account receiving module 650 is configured to receive the user account sent by the server.

In summary, in the apparatus for controlling a device provided by the present embodiment, the control data sent by the terminal device is received, wherein the control data contains a control instruction and signature data. The signature data is sent by the server to the terminal device. The signature data is verified, and if the signature data is verified, the smart device performs operation corresponding to the control instruction. Thus, the smart module can verify the identity of the terminal device based on the signature data. After the signature data is verified, the smart device performs an operation corresponding to the control instruction sent by the terminal device without requiring the server to forward the control instruction sent by the terminal device. It can solve the problem that real time performance in device control is poor due to forwarding instructions via the server to achieve control of the smart device, thereby improving the real time performance of device control.

In addition, the signature is stored such that the terminal device can directly send control data containing a control instruction and the signature data to the smart module next time. After the smart module verifies the signature data, the smart device is instructed to perform the control instruction sent by the terminal device. It won't be necessary to acquire signature data from the server each time, therefore, it can save time of acquiring signature data from the server, thereby improving the efficiency of device control.

Figure 7:
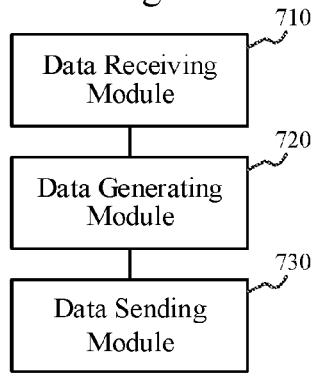
FIG. 7 is a block diagram of an apparatus for controlling a device according to an exemplary embodiment.

FIG. 7 is a block diagram of an apparatus for controlling a device according to an exemplary embodiment. The apparatus for controlling a device is applied in a terminal device. As shown in FIG. 7, the apparatus for controlling a device includes: a data receiving module 710, a data generating module 720 and a data sending module 730.

The data receiving module 710 is configured to receive signature data sent by a server.

The data generating module 720 is configured to generate control data containing a control instruction and the signature data received by the data receiving module 710.

The data sending module 730 is configured to send the control data generated by the data generating module 720 to a smart module in a smart device, so that the smart module instruct the smart device to perform an operation corresponding to the control instruction if the signature data passes verification.

Accordingly, in the apparatus for controlling a device provided by the present disclosure, the signature data sent by the server is received. Control data containing a control instruction and the signature data is generated. The control data is sent to the smart module in the smart device, such that the smart module can verify the identity of the terminal device based on the signature data. After the verification is passed, the smart device performs the control instruction sent by the terminal device. Therefore, the control instruction sent by the terminal device is not required to be forwarded by a server. Thus, it can solve the problem that real time performance of device control is poor when the control of the smart device is forwarded by a server, thereby improving real time performance of device control.

Figure 8:
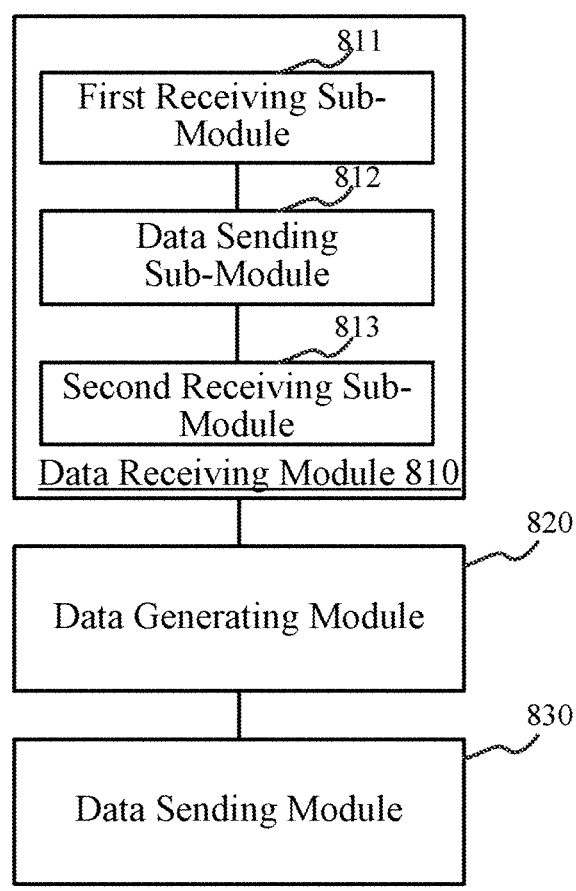
FIG. 8 is a block diagram of an apparatus for controlling a device according to an exemplary embodiment.

FIG. 8 is a block diagram of an apparatus for controlling a device according to an exemplary embodiment. The apparatus for controlling a device is applied in a terminal device. As shown in FIG. 8, the apparatus for controlling a device includes: a data receiving module 810, a data generating module 820 and a data sending module 830.

The data receiving module 810 is configured to receive signature data sent by a server.

The data generating module 820 is configured to generate control data containing a control instruction and the signature data received by the data receiving module 810.

The data sending module 830 is configured to send the control data generated by the data generating module 820 to a smart module in a smart device, so that the smart module instruct the smart device to perform an operation corresponding to the control instruction if the signature data passes verification.

Optionally, the data receiving module 810 further includes: a first receiving sub-module 811, a data sending sub-module 812 and a second receiving sub-module 813.

The first receiving sub-module 811 is configured to receive an identifier broadcast by the smart module.

The data sending sub-module 812 is configured to send the identifier received by the first receiving sub-module 811 and an user account corresponding to the terminal device to the server. The server then bind the identifier with the user account, perform calculation of a key of the smart module and the user account using a predetermined algorithm, send the calculated signature data to the terminal device, and send the user account to the smart module. The smart module verifies the signature data with the user account.

The second receiving sub-module 813 is configured to receive the signature data sent by the server.

In summary, in the apparatus for controlling a device provided by the present embodiment, the control data sent by the terminal device is received, wherein the control data contains a control instruction and signature data. The signature data is sent by the server to the terminal device. The signature data is verified and if the signature data is verified, the smart device performs operation corresponding to the control instruction. Thus, the smart module can verify the identity of the terminal device based on the signature data. After the verification is passed, the smart device performs an operation corresponding to the control instruction sent by the terminal device without requiring the server to forward the control instruction sent by the terminal device. It can solve the problem that real time performance of device control is poor due to forwarding instructions via the server to achieve control of the smart device, thereby improving the real time performance of device control.

In addition, the signature is stored such that the terminal device can directly send control data containing a control instruction and the signature data to the smart module next time. After the smart module verifies the signature data, and the verification is passed, the smart device is instructed to perform the control instruction sent by the terminal device. It won't be necessary to acquire signature data from the server every time, therefore, it can save time of acquiring signature data from the server, thereby improving the efficiency of device control.

With respect to the apparatuses in the above embodiments, the specific manners for performing operations for individual modules therein have been described in detail in the embodiments regarding the relevant methods, which will not be elaborated herein.

Figure 9:
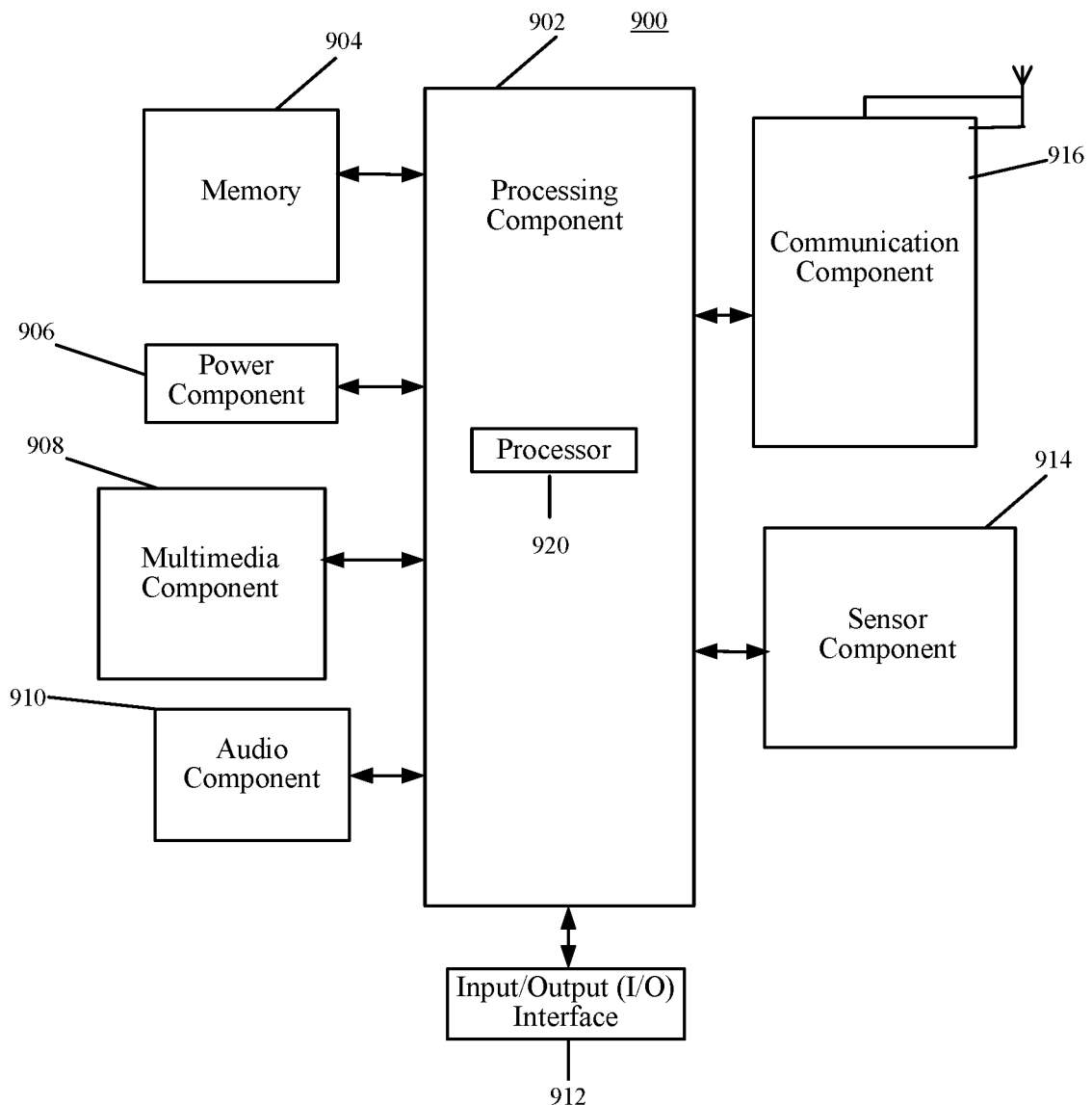
FIG. 9 is a block diagram of an apparatus for controlling a device according to an exemplary embodiment.

FIG. 9 is a block diagram of an apparatus 900 for controlling a device according to an exemplary embodiment. For example, the apparatus 900 can be a mobile phone, a computer, a digital broadcast terminal device, a messaging device, a gaming console, a tablet, a medical device, exercise equipment, a personal digital assistant, and the like.

Referring to FIG. 9, the apparatus 900 can include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 can include one or more processors 920 to execute instructions to perform all or part of the steps in the methods described above. Moreover, the processing component 902 can include one or more modules, which facilitate the interaction between the processing component 902 and other components. For instance, the processing component 902 can include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power for various components of the apparatus 900. The power component 906 can include a power management system, one or more power sources, and any other components associated with the generation, management, and distribution of power in the apparatus 900.

The multimedia component 908 includes a screen providing an output interface between the apparatus 900 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 908 includes a front camera and/or a rear camera. The front camera and the rear camera can receive an external multimedia datum while the apparatus 900 is in an operation mode, such as a photographing mode or a video mode. Each of the front camera and the rear camera can be a fixed optical lens system or have focus and optical zoom capability.

The audio component 910 is configured to output and/or input audio signals. For example, the audio component 910 includes a microphone ("MIC") configured to receive an external audio signal when the apparatus 900 is in an operation mode, such as a call mode, a recording mode, and a voice recognition mode. The received audio signal can be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons can include, but are not limited to, a home button, a volume button, a starting button, and a locking button.

The sensor component 914 includes one or more sensors to provide status assessments of various aspects of the apparatus 900. For instance, the sensor component 914 can detect an open/closed status of the apparatus 900, relative position of components, e.g., the display and the keypad, of the apparatus 900, a change in position of the apparatus 900 or a component of the apparatus 900, presence or absence of user contact with the apparatus 900, an orientation or an acceleration/deceleration of the apparatus 900, and a change in temperature of the apparatus 900. The sensor component 914 can include a proximity sensor configured to detect the presence of nearby objects without any physical contact. The sensor component 914 can also include a light sensor, such as a CMOS or CCD image sensor, for use in imaging applications. In some embodiments, the sensor component 914 can also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module can be implemented based on a radio frequency identifier (RFID) technology, an infrared data association (IrDA) technology, an ultra-wideband (UWB) technology, a Bluetooth (BT) technology, and other technologies.

In exemplary embodiments, the apparatus 900 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In exemplary embodiments, there is also provided a non-transitory computer-readable storage medium including instructions, such as included in the memory 904, executable by the processor 920 in the apparatus 900, for performing the above-described methods. For example, the non-transitory computer-readable storage medium can be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A control method implemented by a smart device configured with a smart module, the method comprising:
receiving control data sent by a terminal device, the control data containing a control instruction and signature data, the signature data being sent by a server to the terminal device, wherein the signature data is obtained by the server performing calculation with a key of the smart module and a user account corresponding to the terminal device according to a predetermined algorithm;
retrieving a user account pre-stored in the smart module, and retrieving the key previously written by the server in the smart module;
performing calculation with the user account and the key according to the predetermined algorithm to obtain verification data;
detecting whether the verification data is identical to the signature data;
when the verification data is identical to the signature data, determining that the signature data is verified; and
if the verification is passed, causing the smart device to perform an operation corresponding to the control instruction.

2. The method of claim 1, wherein the method further comprises:
- broadcasting an identifier of the smart module, for the terminal device to receive the identifier and send the identifier and the user account to the server, for the server to bind the identifier with the user account and generate the signature data, send the signature data to the terminal device and send the user account to the smart module; and
- receiving the user account sent by the server.

3. A method implemented by a terminal device for controlling a smart device, the method comprising:
- receiving an identifier broadcast by a smart module provided in the smart device;
- sending the identifier and an user account corresponding to the terminal device to a server, for the server to bind the identifier with the user account, perform calculation with a key of the smart module and the user account according to a predetermined algorithm, send the calculated signature data to the terminal device, and send the user account to the smart module, for the smart module to verify the signature data with the user account;
- receiving the signature data sent by the server;
- generating control data containing a control instruction and the signature data; and
- sending the control data to the smart module, for the smart module to cause the smart device to perform an operation corresponding to the control instruction when the signature data passes verification.

4. A non-transitory computer-readable storage medium having stored therein instructions that, when executed by a processor of a smart device configured with a smart module, causes the smart device to perform a method comprising:
- receiving control data sent by a terminal device, the control data containing a control instruction and signature data, the signature data being sent by a server to the terminal device, wherein the signature data is obtained by the server performing calculation with a key of the smart module and a user account corresponding to the terminal device according to a predetermined algorithm;
- retrieving a user account pre-stored in the smart module, and retrieving the key previously written by the server in the smart module;
- performing calculation with the user account and the key according to the predetermined algorithm, to obtain verification data;
- detecting whether the verification data is identical to the signature data; and
- when the verification data is identical to the signature data, determining that the signature data is verified; and
- if the verification is passed, causing the smart device to perform an operation corresponding to the control instruction.

5. The non-transitory computer-readable storage medium of claim 4, wherein the method further comprises:
- broadcasting an identifier of the smart module, for the terminal device to receive the identifier and send the identifier and the user account to the server, for the server to bind the identifier with the user account and generate the signature data, send the signature data to the terminal device and send the user account to the smart module; and
- receiving the user account sent by the server.

6. A non-transitory computer-readable storage medium having stored therein instructions that, when executed by a processor of a terminal device, causes the terminal device to perform a method for controlling a smart device, the method comprising:
- receiving an identifier broadcast by a smart module provided in the smart device;
- sending the identifier and an user account corresponding to the terminal device to a server, for the server to bind the identifier with the user account, perform calculation with a key of the smart module and the user account according to a predetermined algorithm, send the calculated signature data to the terminal device, and send the user account to the smart module, for the smart module to verify the signature data with the user account;
- receiving the signature data sent by the server;
- generating control data containing a control instruction and the signature data; and
- sending the control data to the smart module, for the smart module to cause the smart device to perform an operation corresponding to the control instruction when the signature data passes verification.

* * * * *